United States Patent
Gates

(10) Patent No.: US 10,643,159 B2
(45) Date of Patent: May 5, 2020

(54) SYSTEM AND METHOD FOR MINING SITE PRODUCTION PLANNING

(71) Applicant: Caterpillar Inc., Peoria, IL (US)

(72) Inventor: Kevin Eugene Gates, Queensland (AU)

(73) Assignee: Caterpillar Inc., Peoria, IL (US)

( * ) Notice: Subject to any disclaimer, the term of this patent is extended or adjusted under 35 U.S.C. 154(b) by 332 days.

(21) Appl. No.: 15/817,791

(22) Filed: Nov. 20, 2017

(65) Prior Publication Data

US 2019/0153701 A1    May 23, 2019

(51) Int. Cl.

| G06Q 10/06 | (2012.01) |
|---|---|
| E02F 9/20 | (2006.01) |
| G05D 1/02 | (2020.01) |
| G06Q 10/04 | (2012.01) |
| G08G 1/00 | (2006.01) |

(52) U.S. Cl.
CPC ..... *G06Q 10/06312* (2013.01); *E02F 9/2045* (2013.01); *E02F 9/2054* (2013.01); *G05D 1/0276* (2013.01); *G05D 1/0287* (2013.01); *G05D 1/0291* (2013.01); *G06Q 10/047* (2013.01); *G06Q 10/0631* (2013.01); *G08G 1/20* (2013.01); *E02F 9/205* (2013.01)

(58) Field of Classification Search
CPC .......... G06Q 10/06312; G06Q 10/047; G06Q 10/0631; G08G 1/20; G05D 1/0287; G05D 1/0291; G05D 1/0276; E02F 9/2054; E02F 9/2045; E02F 9/205
See application file for complete search history.

(56) References Cited

U.S. PATENT DOCUMENTS

| 6,351,697 B1 * | 2/2002 | Baker ................... G01G 19/08 |
|---|---|---|
| | | 701/50 |
| 8,190,173 B2 | 5/2012 | Olson |
| 8,504,505 B2 | 8/2013 | Mintah |
| 8,626,565 B2 | 1/2014 | Petroff |
| 8,862,390 B2 * | 10/2014 | Sugawara et al. .......................... |
| | | G01C 21/3667 |
| | | 701/431 |
| 2009/0096637 A1 | 4/2009 | Olson |
| 2010/0287073 A1 | 11/2010 | Kocis |

(Continued)

FOREIGN PATENT DOCUMENTS

| AU | 2002300598 B2 | 3/2008 | |
|---|---|---|---|
| CA | 2957708 A1 * | 8/2017 | ............ G06Q 10/06 |

(Continued)

*Primary Examiner* — Dale W Hilgendorf
(74) *Attorney, Agent, or Firm* — Gutwein Law

(57) ABSTRACT

A system for mining site production planning includes a control system configured to specify a problem-solving technique and associated optimization problem for a mining site by setting production goals for each of loading tools, processors and production arcs of the mining site, sorting the production arcs in an order based on travel distances, and modifying the order of the sorted production arcs based on the production goals for each of the loading tools, processors and production arcs. In addition, target values are set for each of the loading tools, processors and production arcs according to the order of the sorted production arcs. The control system is further configured to solve the optimization problem to produce production values for each of the loading tools, processors and production arcs based on the target values.

20 Claims, 9 Drawing Sheets

(56) References Cited

U.S. PATENT DOCUMENTS

2013/0054133 A1* 2/2013 Lewis et al. ......... G07C 5/0841
　　　　　　　　　　　　　　　　　701/423
2013/0339098 A1　12/2013 Looman
2019/0033808 A1* 1/2019 Mountford et al. . G05B 19/048

FOREIGN PATENT DOCUMENTS

CN　　　105528644 A　　4/2016
WO　　2016/18122 A1　　7/2016

* cited by examiner

SYSTEM AND METHOD FOR MINING SITE PRODUCTION PLANNING

TECHNICAL FIELD

The present disclosure relates generally to mining site production planning and, more particularly, to a control system for specifying and solving an algorithm and associated optimization problem for producing production values for loading tools, processors and production arcs of a mining site.

BACKGROUND

In a number of industries, vehicles or other transportation methods are used to pick up loads from one location and deliver the loads to another location. An exemplary industry that works within this model is the mining industry, in which material transportation involves a mining machine picking up a load of ore from a loading tool and transporting that ore to a processor. Additionally, processed ore may need to be transported to another site for additional processing. Because of this, material transport is an important aspect in the mining industry and can represent a large percentage of costs associated with mining.

A dispatching system for controlling the usage of mining machines within a mine can be used to optimize material transport and reduce costs. The essence of a dispatching system is to determine, every time a mining machine leaves a location in the mine, where the "best" place is for that mining machine to go. Determining the "best" place for the mining machine to go involves optimizing an objective, such as, for example, maximizing the overall production of the mine or minimizing hauling distances.

Two approaches have typically been used for dispatching systems—single-stage and multi-stage. Single-stage systems dispatch mining machines according to one or several criteria. However, single-stage systems do not take into account any production targets or constraints. Single-stage systems are often heuristic, or non-mathematical, rules to determine the mining machine assignments. Multi-stage systems, on the other hand, divide dispatching problems into multiple stages. Typically, multi-stage systems include an upper stage, which consists of calculating a production plan that optimizes use of mining equipment, and a lower stage, which consists of calculating individual assignments according to the restrictions and assignment groups in usage and according to deviations from the production plan. However, the production plan implies the most productive paths (i.e., shortest paths) are returned in the optimal solution.

U.S. Pat. No. 6,741,921 to Cohen et al. discloses a system and method for providing dispatch assignments to a plurality of vehicles in an environment including a plurality of sources and a plurality of processing sites. A production plan is determined based on environment information and optimal criteria. Based on the production plan and consideration of a cooperative assignment and/or anticipated future environment conditions, a dispatch assignment is selected for each vehicle.

SUMMARY OF THE INVENTION

In one aspect, a system for mining site production planning includes a control system configured to specify a problem-solving technique and associated optimization problem for a mining site by setting production goals for each of loading tools, processors and production arcs of the mining site, sorting the production arcs in an order based on travel distances, and modifying the order of the sorted production arcs based on the production goals for each of the loading tools, processors and production arcs. The problem-solving technique is also specified by setting target values for each of the loading tools, processors and production arcs according to the order of the sorted production arcs. The control system is further configured to solve the optimization problem to produce production values for each of the loading tools, processors and production arcs based on the target values.

In another aspect, a method for mining site production planning includes receiving production goals for each of loading tools, processors and production arcs of a mining site, at a controller. The method also includes sorting the production arcs in an order based on travel distances, modifying the order of the sorted production arcs based on the production goals for each of the loading tools, processors and production arcs, and setting target values for each of the loading tools, processors and production arcs according to the order of the sorted production arcs, using the controller. The method further includes producing production values for each of the loading tools, processors and production arcs based on the target values, using the controller.

In yet another aspect, a control system for mining site production planning includes a controller programmed to specify a problem-solving technique and associated optimization problem for a mining site by receiving production goals for each of loading tools, processors and production arcs of the mining site, and sorting the production arcs in an order. The controller is also programmed to modify the order of the sorted production arcs based on the production goals for each of the loading tools, processors and production arcs, and set target values for each of the loading tools, processors and production arcs according to the order of the sorted production arcs. The controller is further programmed to solve the optimization problem to produce production values for each of the loading tools, processors and production arcs based on the target values.

Other features and aspects will be apparent from the following description and accompanying drawings.

DETAILED DESCRIPTION

Figure 1:
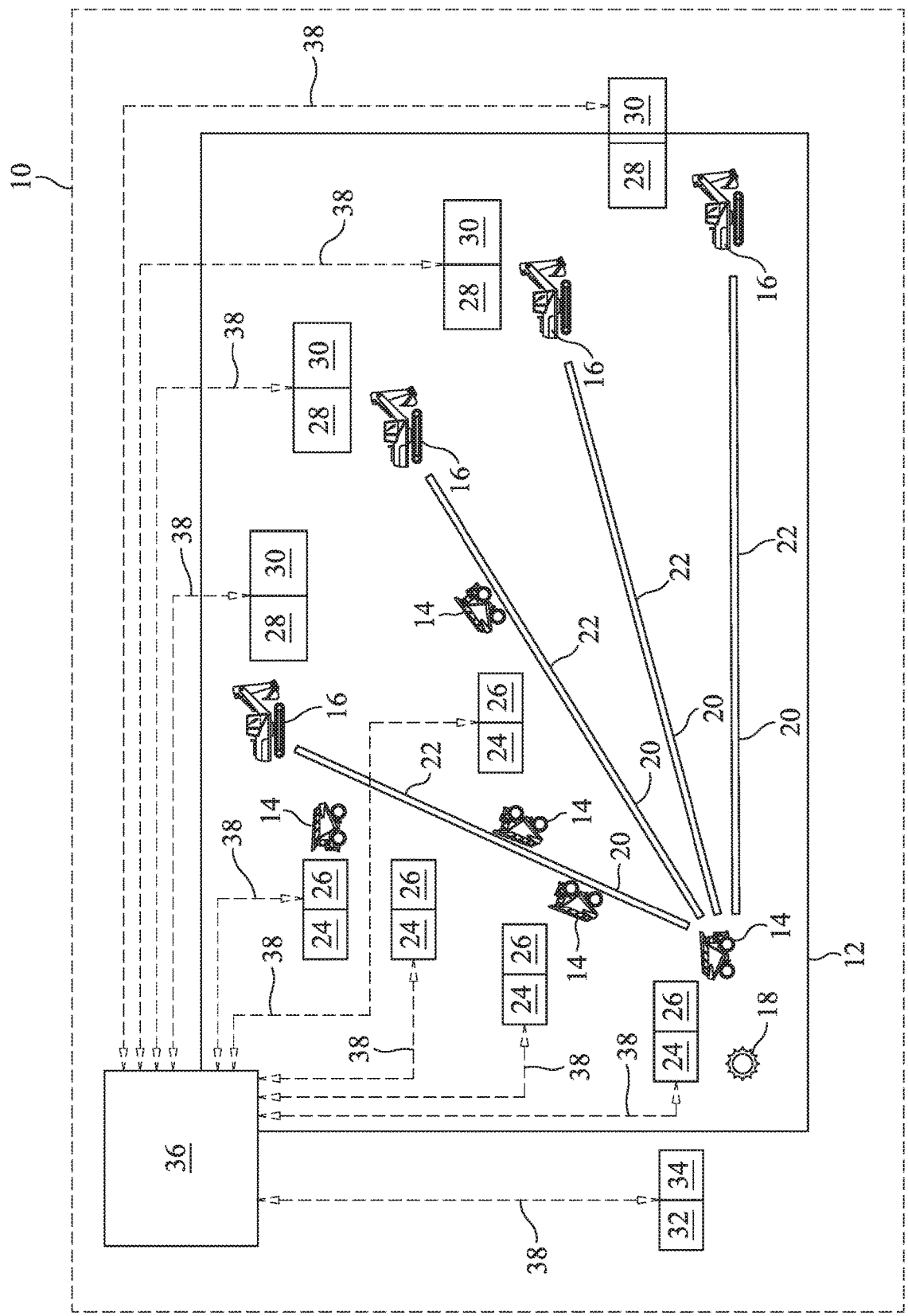
FIG. 1 is a schematic diagram of an exemplary system for mining site production planning, according to the present disclosure.

Reference will now be made in detail to specific embodiments or features, examples of which are illustrated in the accompanying drawings. Wherever possible, corresponding or similar reference numerals will be used throughout the disclosure and accompanying drawings to refer to the same or corresponding parts.

FIG. 1 illustrates a system 10 consistent with an exemplary embodiment of the present disclosure. As shown diagrammatically in FIG. 1, the system 10 includes a mining site 12, which may include a plurality of mining machines 14, such as mining trucks, a plurality of loading tools 16, and a plurality of processors 18, such as, crushers, for example. The mining machines 14 may transport ore or other materials from the loading tools 16 to the processors 18 across a plurality of production arcs 20, or paths. The production arcs 20 may also represent return arcs 22, along which the mining machines 14 may return, in an empty state, to one of the loading tools 16. Although a specific number of mining machines 14, loading tools 16, processors 18, production arcs 20 and return arcs 22 are shown, the mining site 12 may include any number or combination of these component parts of the mining site 12. The illustration is provided for exemplary purposes only.

The mining machines 14 may each include an onboard system 24 and/or a monitoring device 26. The onboard system 24 may be an electronic system and may include a user interface, which may include a display element, for providing information to an operator and/or receiving control instructions or other input from the operator. Further, the onboard system 24 and/or the monitoring device 26 may be equipped with a position sensing system, such as a global positioning system (GPS), a laser positioning system, and/or an inertial navigation unit, and wireless communication capabilities. The monitoring device 26 may also be electronic and may be equipped with sensors and/or other components to monitor travel time, detect potential mechanical failures, quantify the load of the mining machine 14, and/or obtain other information about the mining machine 14 and its operation.

The loading tools 16 may retrieve and deliver ore or other materials to the mining machines 14 at various locations throughout the mining site 12. The loading tools 16 may include shovels or other equipment that delivers loads to the mining machines 14. Each loading tool 16 may include an onboard system 28 and/or monitoring device 30, similar to those described above. That is, the onboard system 28 may include a user interface, which may include a display element, for providing information to the operator and/or receiving control instructions or other input from the operator. Further, the onboard system 28 and/or monitoring device 30 may be equipped with a position sensing system, such as a GPS, a laser positioning system, and/or an inertial navigation unit, and wireless communication capabilities. In addition, the monitoring device 30 may monitor information about the loading tool 16, such as, for example, a current level of ore available for pick-up. Further, the monitoring device 30 may be equipped to identify the type of load dug by the loading tool 16.

The processors 18 (only one of which is shown) may receive ore or other materials from the mining machines 14 for processing. For example, the processors 18 may include crusher machines. Each of the processors 18 may also include an onboard system 32 and/or monitoring device 34, which may be located on or near the processors 18. The onboard system 32 may include a user interface, which may include a display element, for providing information to the operator and/or receiving control instructions or other input from the operator. The onboard system 32 and/or monitoring device 34 may be equipped with wireless communication capabilities and may monitor information about the processor 18, such as, for example, a current level of ore for processing. Further, the monitoring device 34 may also include static information, such as the total capacity or processing rate of the processor 18.

The production arcs 20 are representative of the flow of material at the mine site 12. That is, the production arcs 20 represent the flow resulting from loading operations at the loading tools 16 and then following the material through the road network and the unloading operations at processors 18. For example, each production arc 20 may be defined by the loading tool 16, processor 18, mining machine 14, material loaded into the mining machine 14, and the path from the loading tool 16 to the processor 18. The return arcs 22 describe the return path of the mining machine 14, when it travels in an empty state from the processor 18 back to the loading tool 16 along a path.

The mining machines 14 may be dispatched to and from loading tools 16 and/or processors 18 via a control system 36. For example, after the mining machine 14 delivers its load to a processor 18, the control system 36 may direct the mining machine 14 to a specific one of the loading tools 16 or another location of the mining site 12. The control system 36 may communicate with, and exchange information with, the onboard systems 24, 28 and 32 and/or monitoring devices 26, 30 and 34 of the mining machines 14, loading tools 16, and processors 18 via wireless communications lines 38.

Figure 2:
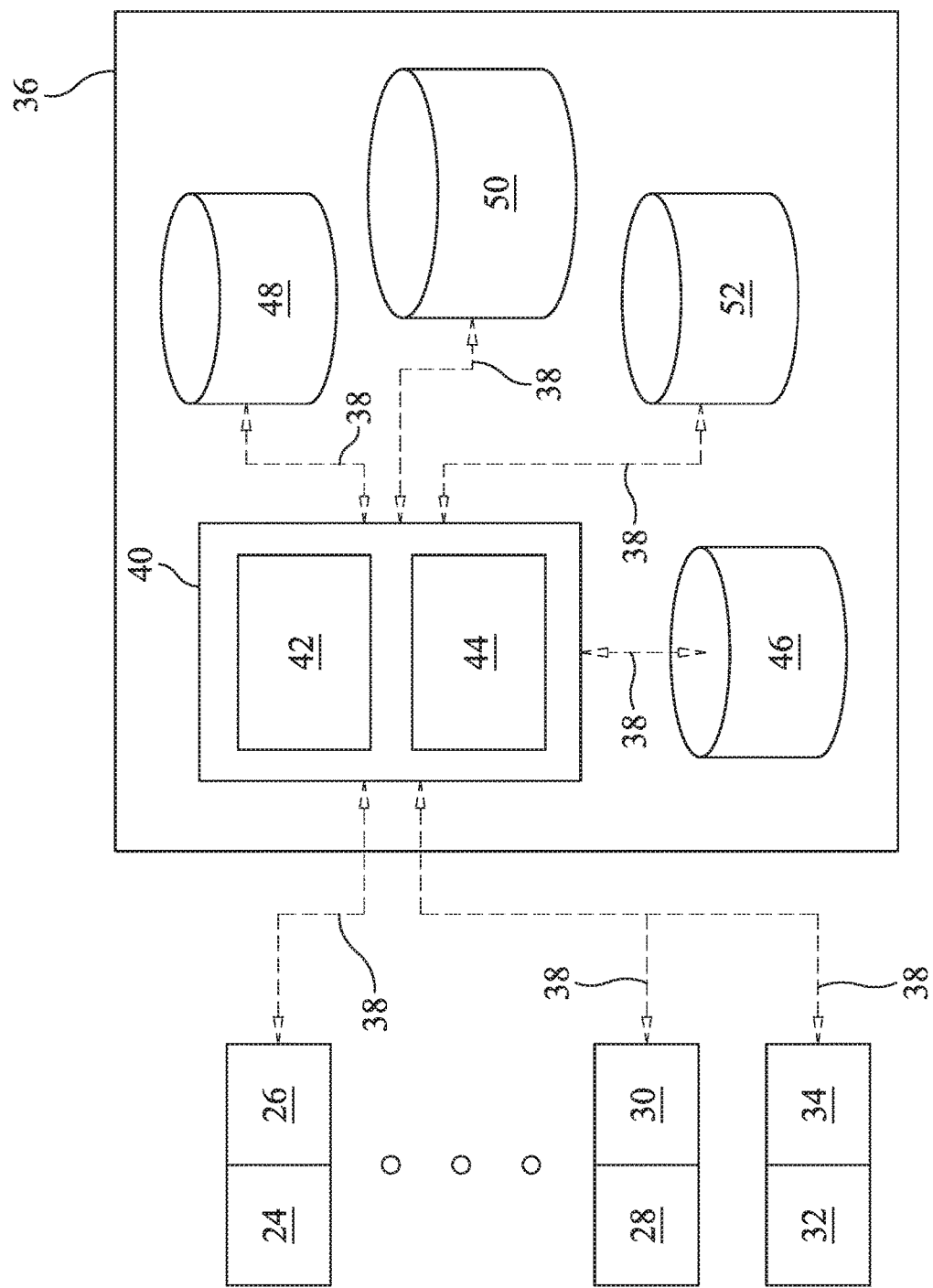
FIG. 2 is a block diagram of the control system of FIG. 1.

As shown in FIG. 2, the control system 36, according to an exemplary embodiment, may include a controller 40, such as an electronic controller, with the controller 40 including a processor 42 and a memory 44. The controller 40 may also include storage, a display, a network interface and an input/output device, for example. The processor 42 may execute unique sets of instructions, which may be implemented as computer readable program code, stored in the memory 44, such that the controller 40 and/or control system 36 and/or a portion thereof is configured as a special purpose system. In particular, hardware, software, and particular sets of instructions may transform the control system 36 into the system 10 for mining site production planning described herein, or portions thereof.

The controller 40 may be in communication with one or more databases, such as, for example, a process database 46, a configuration database 48, a route assignments database 50 and a mine image database 52. The process database 46 may include instructions for performing a variety of processes required to optimize material transport. For example, the process database 46 may include instructions for performing steps, or stages, of the mining site production planning method described herein.

The configuration database 48 may include current system settings, such as choice of optimization criterion, specifications of blending requirements, and other solution parameters, for example. The route assignments database 50 may include route dispatch assignments, before and/or after the dispatch assignments are provided to the mining machines 14, and various other dispatch information. The mine image database 52 may include information about the mining site 12, including, for example, information about each piece of equipment (such as location and current status), information about material excavated by each loading tool 16, the current blending at each processor 18, and other relevant mine information. Although specific examples are provided, the number of databases 46, 48, 50 and 52 and/or information provided in the various databases 46, 48, 50 and 52 may vary depending on specifics of the particular application.

Figure 3:
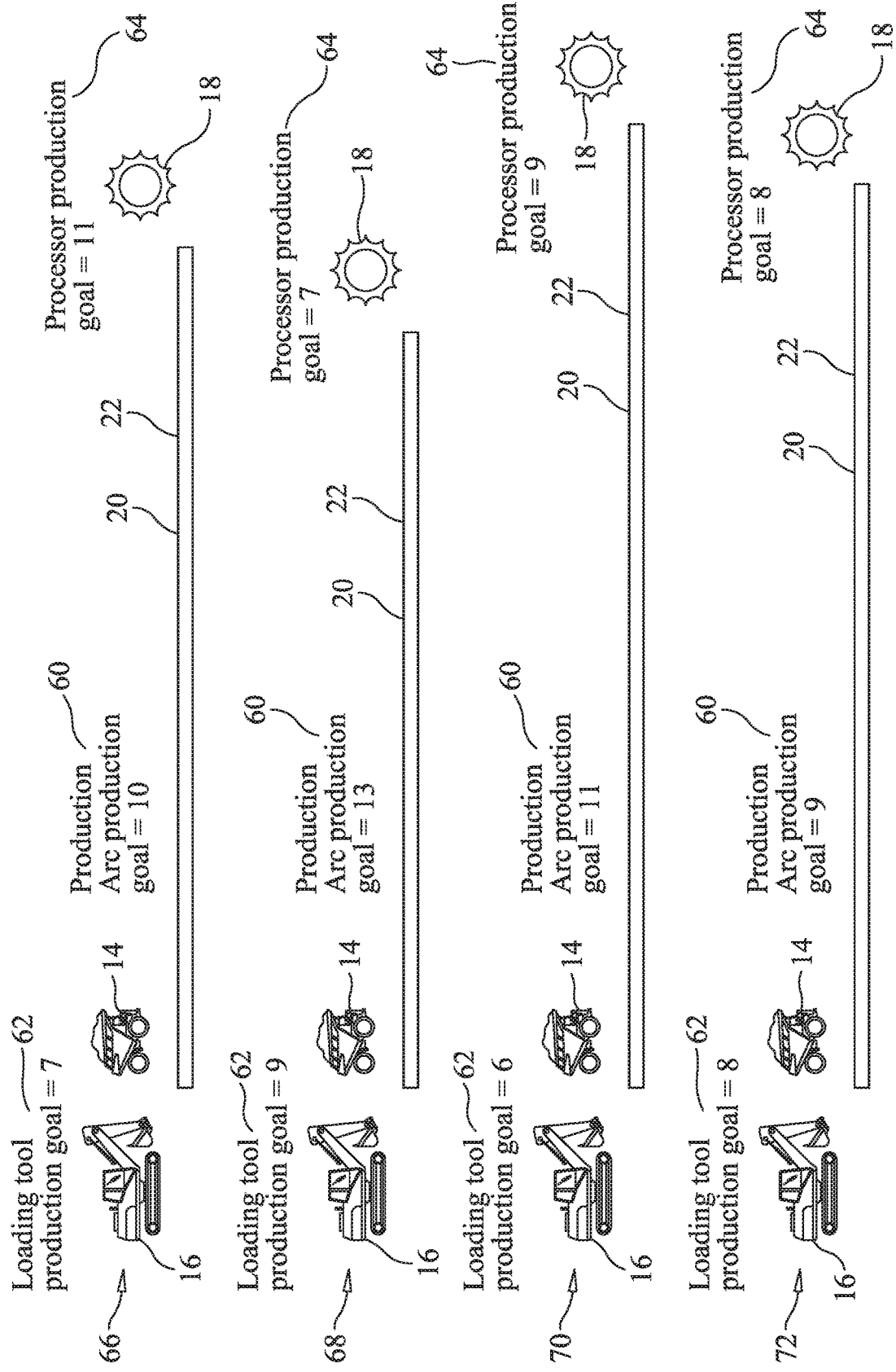
FIG. 3 is a schematic representation of a stage in an exemplary method of mining site production planning, according to an aspect of the present disclosure.

The control system 36 may be programmed and/or configured to calculate a production plan for the mining site 12 and, further, to produce dispatch assignments for the mining machines 14 based on the production plan. In particular, the control system 36 may be configured to specify a problem-solving technique and associated optimization problem for the mining site 12, and solve the optimization problem using a solution engine. At a first stage, as illustrated in FIG. 3, production arc production goals 60, loading tool production goals 62 and processor production goals 64 may be calculated and/or set. The production goals 60, 62 and 64 may be set by the mine operators and may include specific targets of type/quantity of material extracted, hauled and processed by specific loading tools 16 and processors 18, for example.

A first row 66 illustrates a first production arc 20, a second row 68 illustrates a second production arc 20, a third row 70 illustrates a third production arc 20 and a fourth row 72 illustrates a fourth production arc 20. The mining site 12, however, may include any number of production arcs 20 and, thus, rows.

One phase of setting the production goals 60, 62 and 64 is to consider the capacity of the loading tools 16. Each loading tool 16 has a nominal loading capacity determined by the time required by the loading tool 16 to load each class of mining machine 14. The number of mining machines 14 that can operate with the loading tool 16 because of compatibility and availability or due to locks and bars from the loading tool 16 or the destination processor 18 may lower the loading tool capacity. The speed and capacity of the destination processor 18 may also lower the operational loading tool capacity. Additionally, any goals or limits imposed by the mine operators may also lower the operational loading tool capacity.

Another phase is to consider the capacity of the processors 18. Each processor 18 has a nominal processing capacity determined by the time required by the processor 18 to handle each class of mining machine 14. The number of mining machines 14 that can operate with the processor 18 because of compatibility and availability or due to locks and bars from the associated loading tool 16 or the processor 18 may lower the processor capacity. Additionally, any goals or limits imposed by the mine operators may also lower the operational processor capacity.

Another phase is to consider the capacity of each of the production arcs 20 and associated return arcs 22 and the total production capacity. The number of mining machines 14 available for the production arcs 20 and associated return arcs 22 should also be considered. Further, any goals set on the production arcs 20 and associated return arcs 22 may lower the arc capacity.

Figure 4:
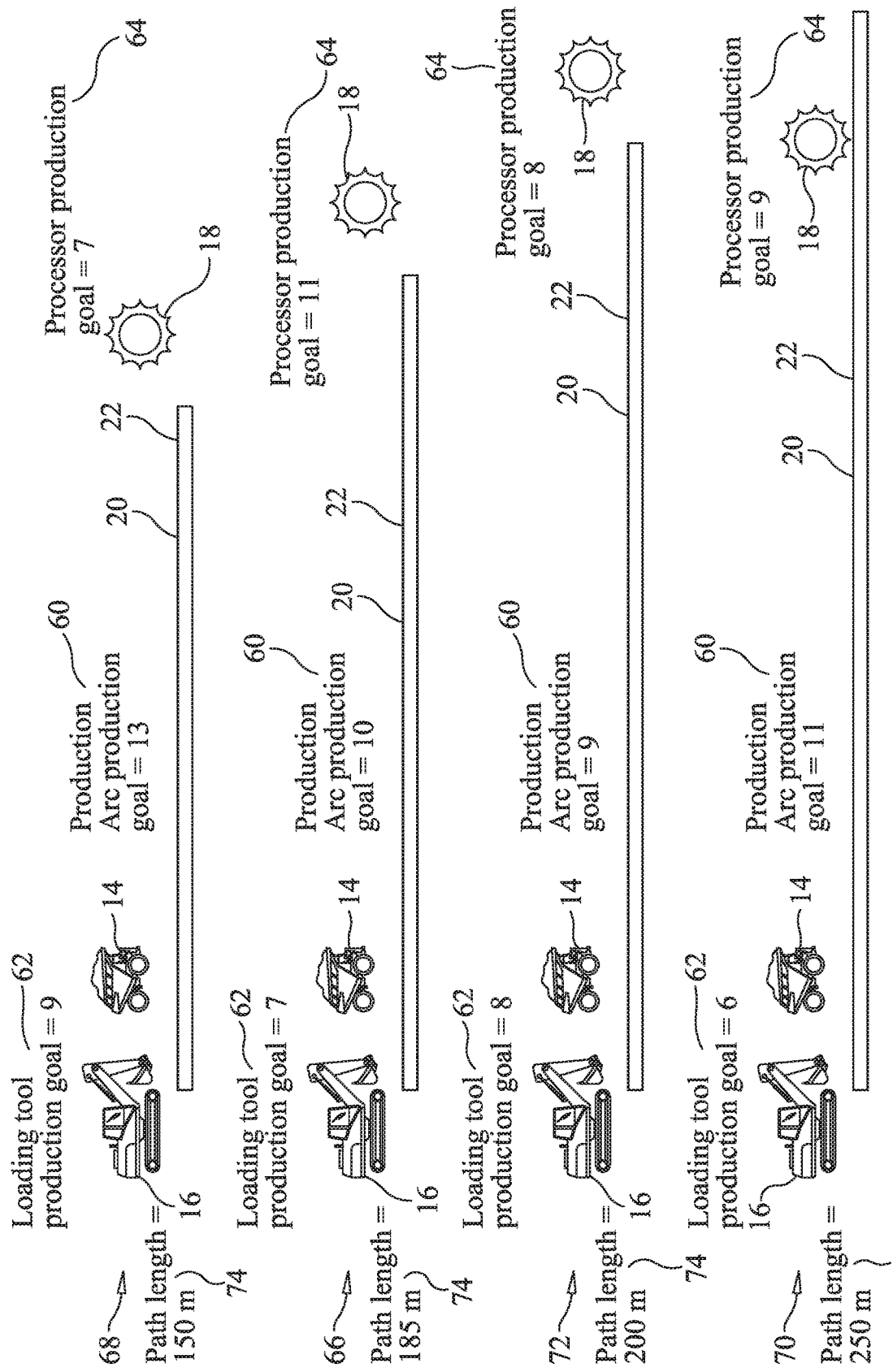
FIG. 4 is a schematic representation of another stage in the exemplary method of mining site production planning, according to an aspect of the present disclosure.

FIG. 4 depicts a second stage of the method for calculating a production plan for the mining site 12, and includes sorting the production arcs 20 in an order based on travel distances 74, or path lengths. That is, since the maximum production will be produced by using the shortest travel distance 74 this stage includes sorting all of the available production arcs 20 by travel distances 74, with the shortest production arc 20 (second row 68) at the top. Ordered as such, the first row 66 would be after the second row 68, followed by the fourth row 72 and then the third row 70.

Figure 5:
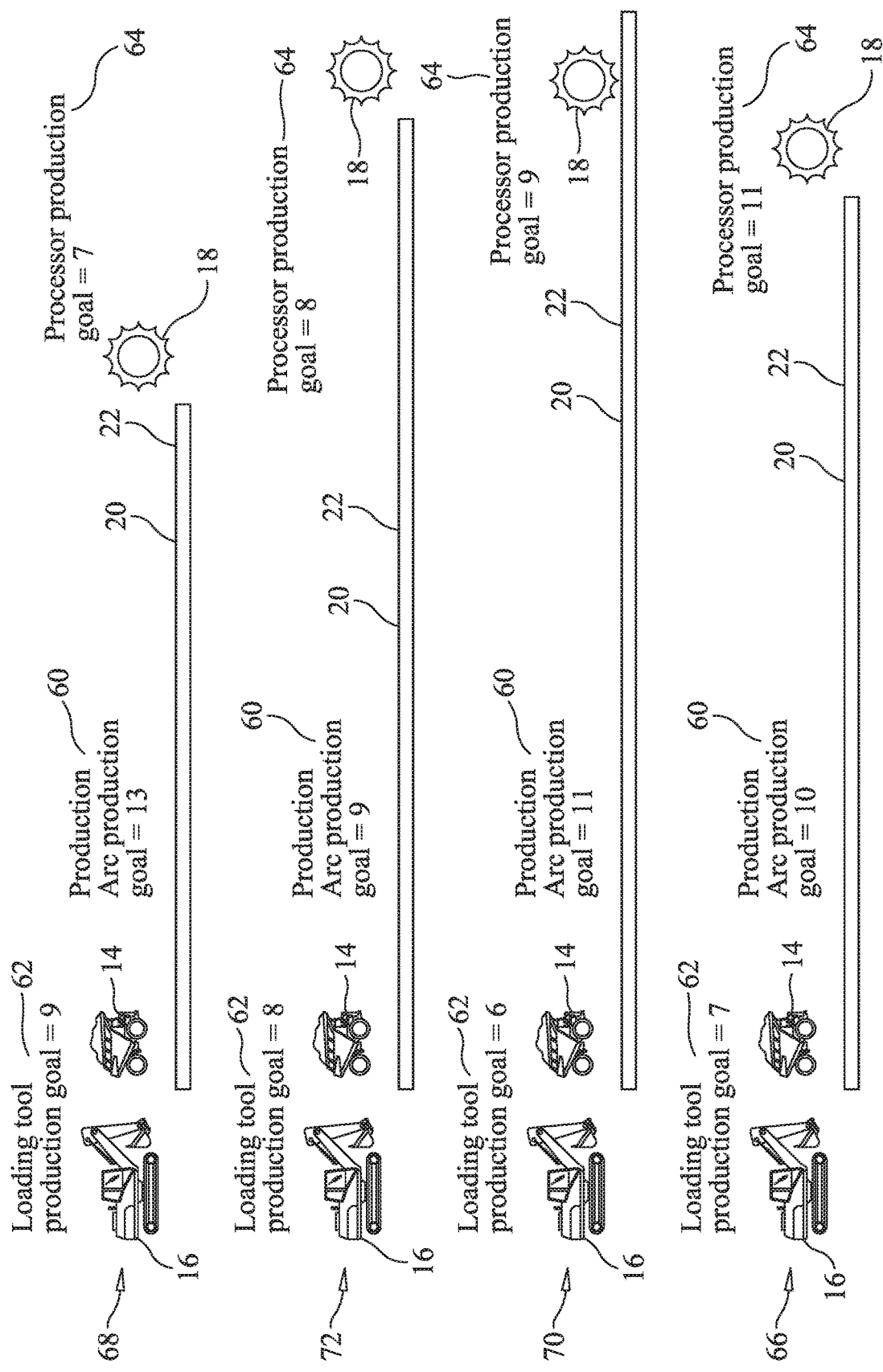
FIG. 5 is a schematic representation of another stage in the exemplary method of mining site production planning, according to an aspect of the present disclosure.

Turning now to FIG. 5, the order of the sorted production arcs 60, as illustrated in FIG. 4, may be modified based on the established production goals (e.g., production arc production goals 60, loading tool production goals 62 and processor production goals 64). That is, the list may be modified by considering each of the production goals set by the mine operators, such as in inverse priority. Any restrictions on production, such as "no more than" goals, may then be set on the arc capacity to ensure they are followed. The "at least" and "equals" goals may then be considered and the associated production may be positioned at the top of the sorted list. This set ensures that all of the goals are considered and the explicit desired production arcs are at the top of the sorted production arc list.

Figure 6:
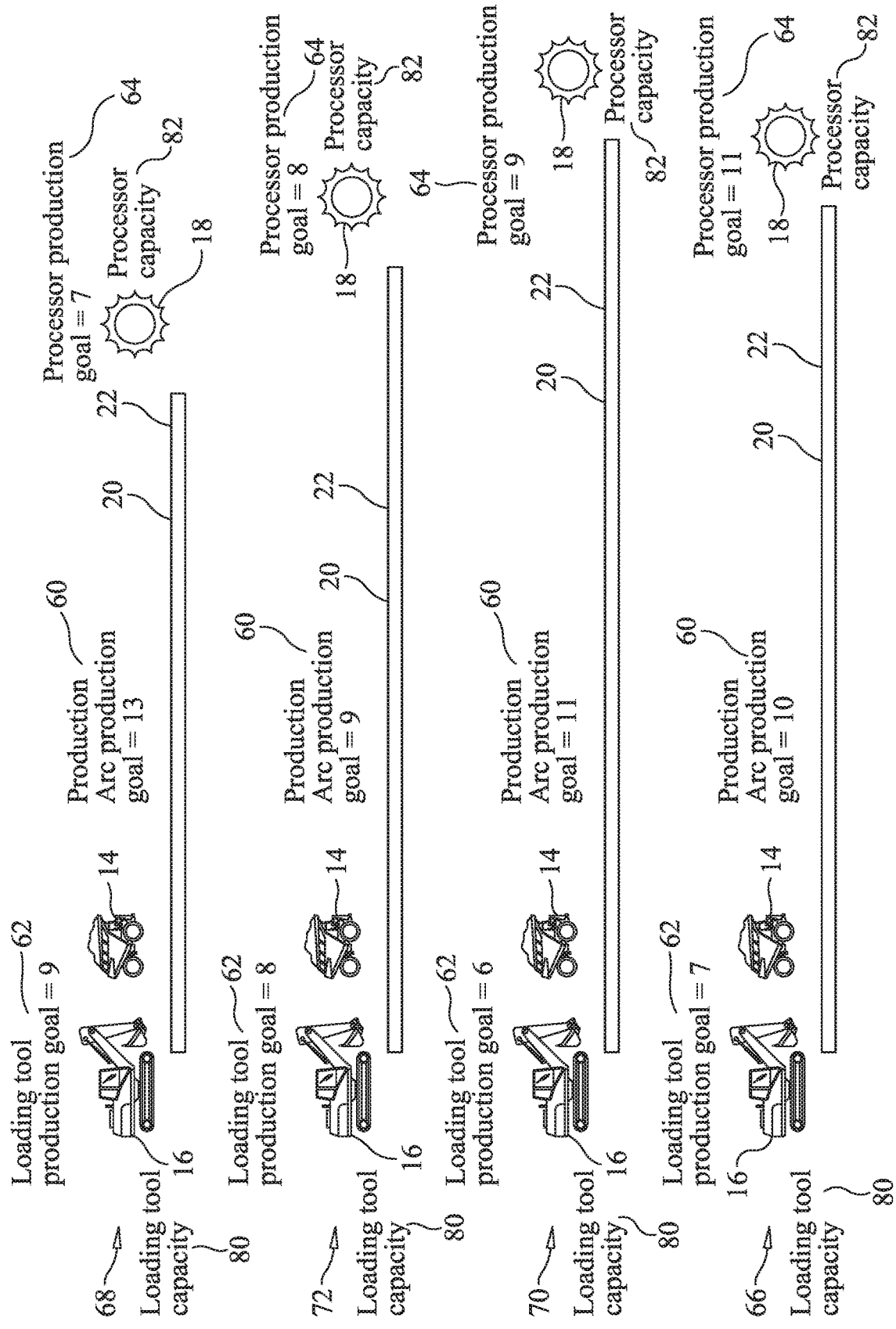
FIG. 6 is a schematic representation of another stage in the exemplary method of mining site production planning, according to an aspect of the present disclosure.

Next, referring to FIG. 6, loading tool capacity 80 and processor capacity 82 are associated with the productions arcs 60. According to this next phase, each production arc 60 in the sorted list may be considered in order and available loading tool production and processor production may be associated. In this way, the loading tool capacity 80 and the processor capacity 82 is decremented as each production arc 60 is considered.

Figure 7:
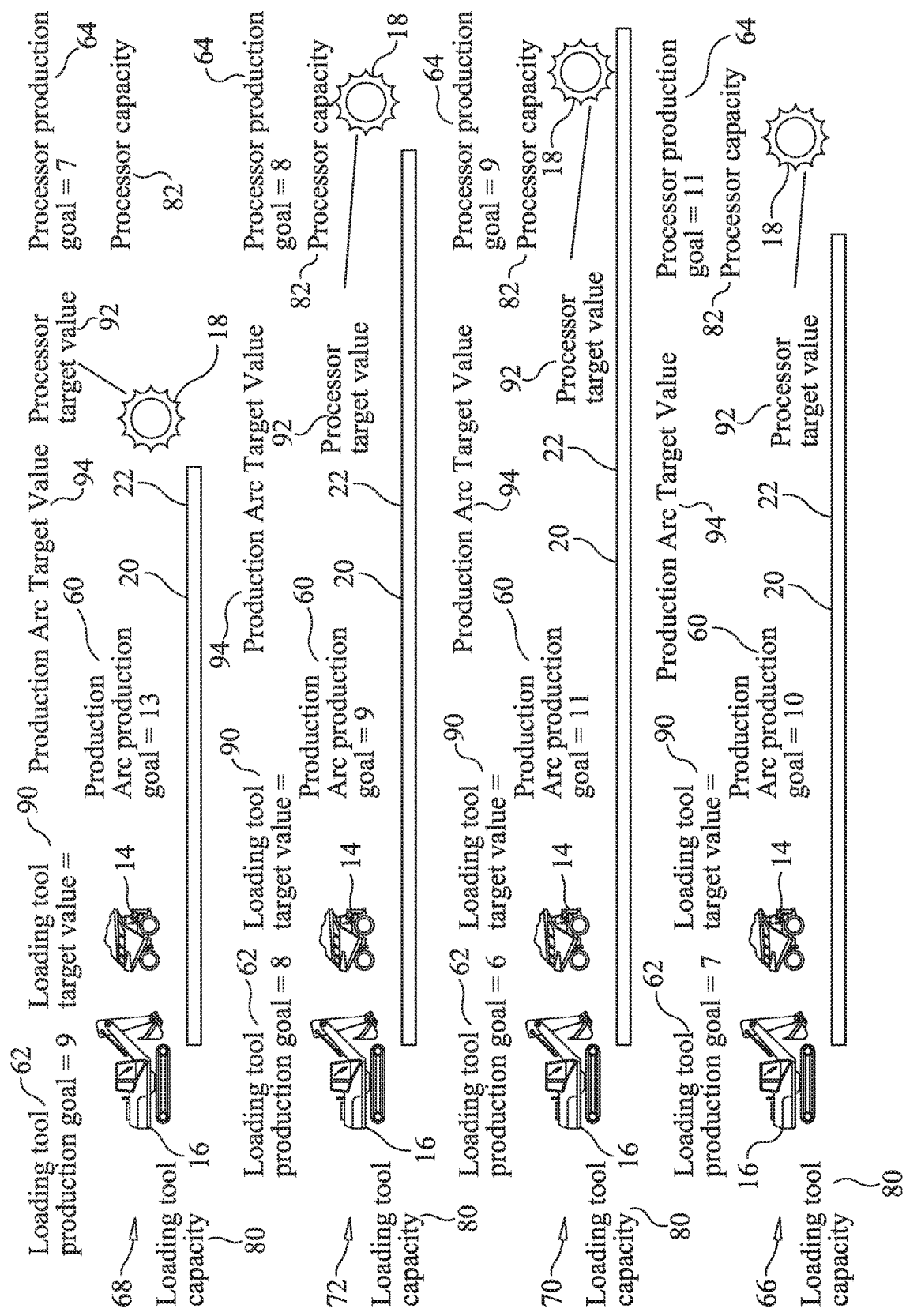
FIG. 7 is a schematic representation of yet another stage in the exemplary method of mining site production planning, according to an aspect of the present disclosure.

At FIG. 7, loading tool target values 90, processor target values 92 and production arc target values 94 are incrementally set based on the loading tool capacity 80 and processor capacity 82. When the loading tool capacity 80 or processor capacity 82 is depleted, then the target value 94 for the arc 20 is set to zero. After this process is completed we have target values 90, 92 and 94 for each of the available production arcs 20 as well as each loading tool 16 and processor 18.

Figure 8:
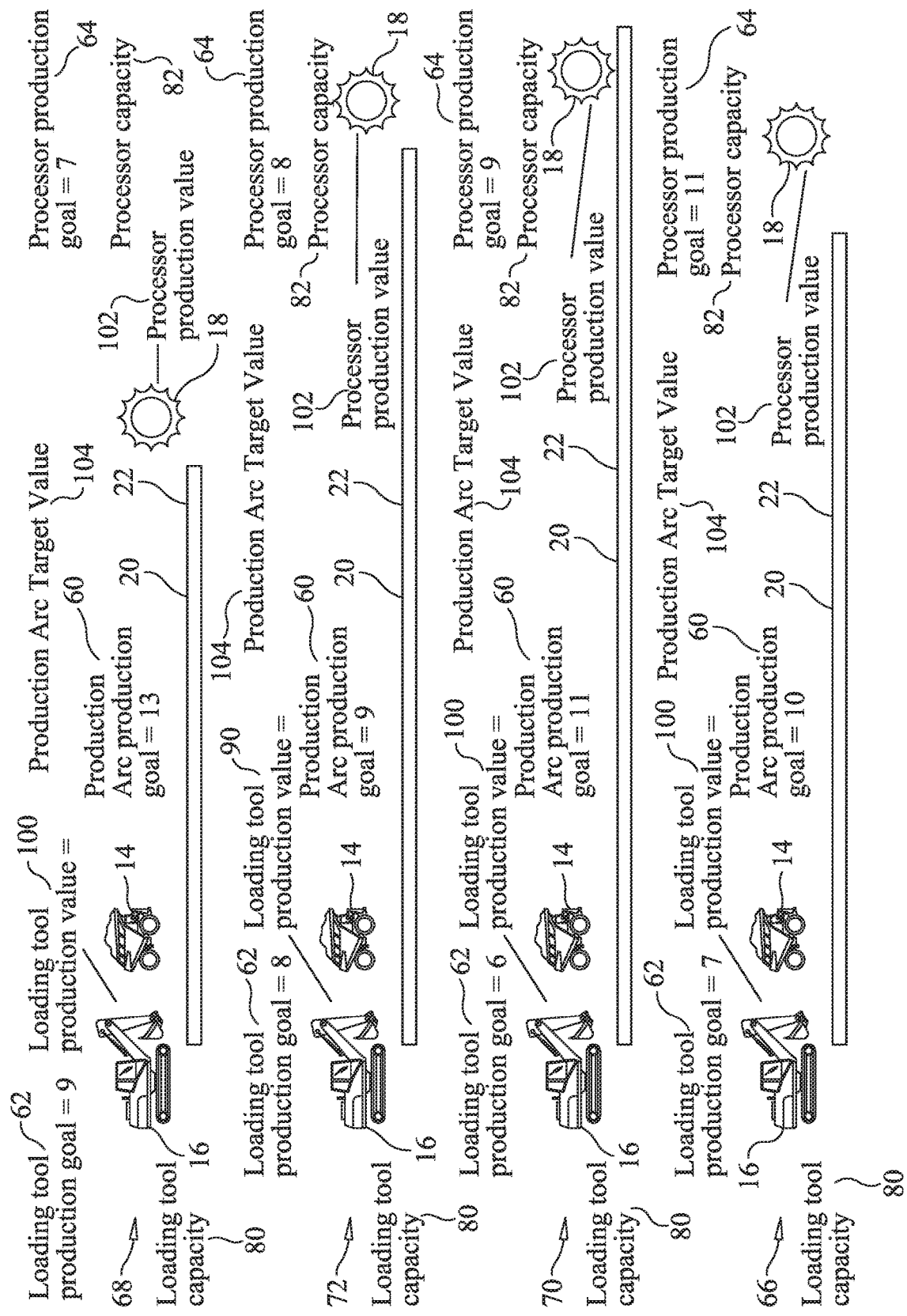
FIG. 8 is a schematic representation of yet another stage in the exemplary method of mining site production planning, according to an aspect of the present disclosure.

At this stage, a least squares algorithm, or other algorithm, is specified and the associated optimization problem can be solved under the constraint that the restraint values should all be positive. The algorithm will then produce production values (e.g., loading tool production values 100, processor production values 102 and production arc production values 104), as illustrated in FIG. 8, based on the target values 90, 92 and 94 for each of the loading tools 16, processors 18 and production arcs 20 that will optimize the production to meet as close as possible any production goals 60, 62 and 64 set by the mine operators as well as maximizing production under the given restrictions. In addition, target values 90, 92 and 94 for less productive and/or longer production arcs 60 may be set to zero so that they may be excluded from the calculation. Further, for blend targets to a particular processor 18 the blend may be decomposed into production level targets on the loading tools 16 that are feeding the blend. These targets can be directly used in the least squares solution.

INDUSTRIAL APPLICABILITY

The system and method for mining site production planning are applicable to a variety of mining sites, including mining sites utilizing mining machines, loading tools, processors and production arcs. Further, the system and method are applicable to mining sites in which a control system determines route assignments for the mining machines. Yet further, the system and method are applicable to control systems determining route assignments based on a production plan identified for the mining site.

A mining site 12 may include a plurality of mining machines 14, loading tools 16 and processors 18. According to a specific example of operation, each mining machine 14 travels to a loading tool 16 and picks up a load of ore or other material. The mining machine 14 then travels to a processor 18, where the ore is delivered, and then the mining machine 14 restarts the cycle by proceeding again to a loading tool 16. In order to optimize material transport, the mining machine 14 may be directed to a loading tool 16 or processor 18 based on system guidelines. According to the present disclosure, goals of the mining operators are prioritized, shortest path production is maximized and optimization is achieved using a least squares algorithm. That is, the mining site 12 may be designed with specific targets of type/quantity of material extracted, hauled and processed by specific loading tools 16 and processors 18.

Referring generally to FIGS. 1-9, the system 10 of the present disclosure may be designed to maximize the transport of materials from loading tools 16 to processors 18. In a first stage, a production plan may be calculated that optimizes the usage of the equipment at the mining site 12 and then, in a second stage, individual assignments are calculated according to the restrictions and assignment groups in usage and according to the deviation from the production plan. Because all assignments are based on the deviation from the production plan, it is important that the production plan reflects the implicit and explicit production goals of the mine operators so that the resultant production is in accordance with the mine's production goals. Mine management seeks to not just maximize tons/hour hauled at the mining site 12, but design the mining site 12 with specific targets of type/quantity of material extracted, hauled, and processed by specific loading tools 16 and processors 18.

The present disclosure relates to the calculation of a production plan that reflects the goals of the mine operators. According to the system 10 and method of the present disclosure, the control system 36 may be configured to specify a problem-solving technique and associated optimization problem for the mining site 12. In particular, production may be optimized by setting goals for each of the available production arcs 20 and each of the available loading tools 16 and each of the available processors 18, based on the goals of the mine operators, and then using an algorithm, such as a least squares algorithm, to minimize the difference between the given goals and the calculated production. The optimal solution is one that is closest to the desired production on each of the arcs 20 while considering the capacity of the available loading tools 16 and processors 18 as well as the number and capacity of the available mining machines 14.

Figure 9:
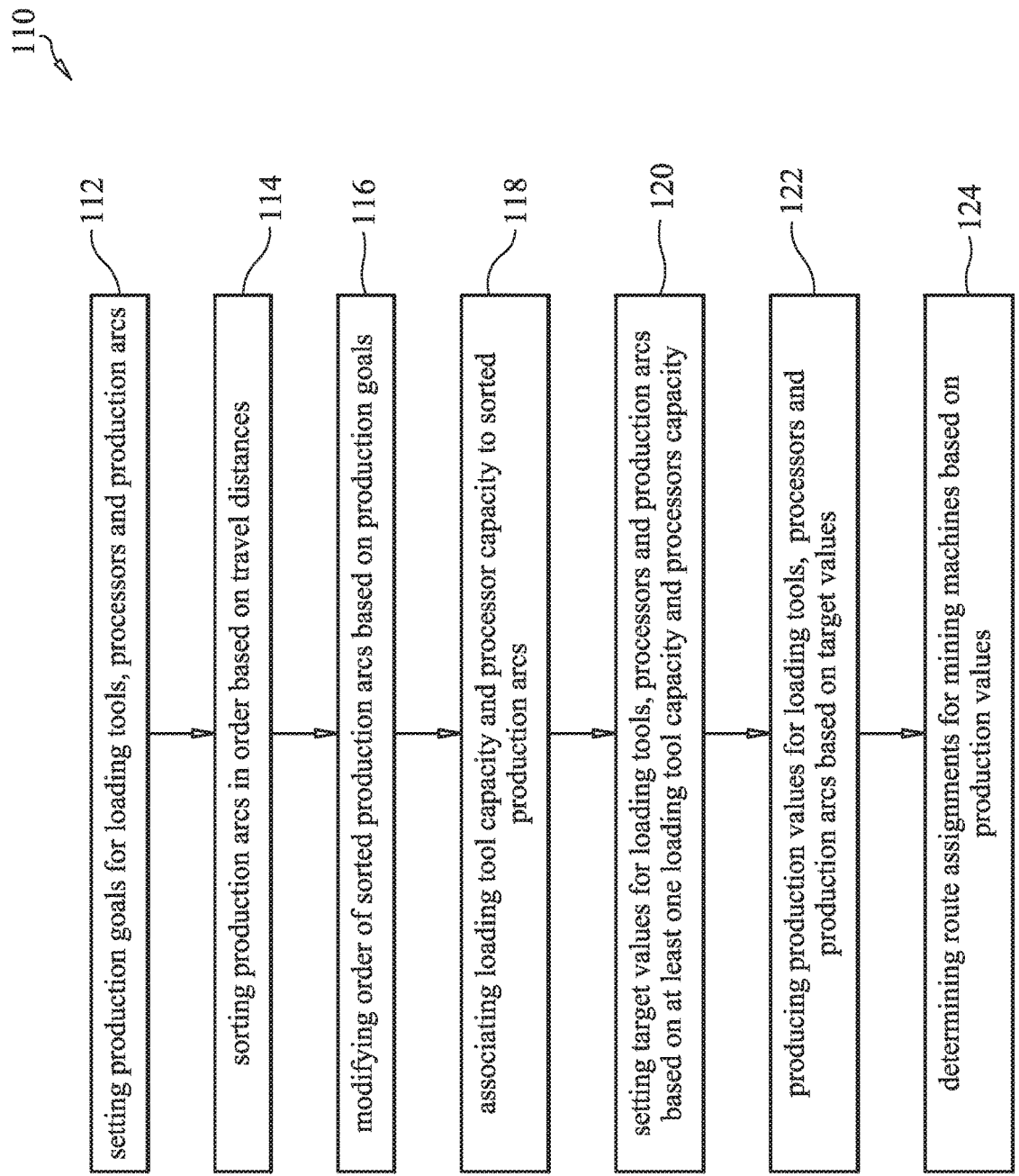
FIG. 9 is a flow diagram representing various stages in the exemplary method of mining site production planning of the present disclosure.

FIG. 9 is a flow diagram 110 representing an exemplary method of mining site production planning using the system 10. In particular, the control system 36 is configured to specify a problem-solving technique and associated optimization problem for the mining site 12 by setting production goals 60, 62 and 64 for each of the loading tools 16, processors 18 and production arcs 20, at box 112. At box 114, the production arcs 20 are sorted in an order based on travel distances 74. The order is then modified, at box 116, based on the production goals 60, 62 and 64 for each of the loading tools 16, processors 18 and production arcs 20.

Loading tool capacity 80 and processor capacity 82 are associated to the sorted production arcs 20, at box 118. At box 120, target values 90, 92 and 94 are set for the loading tools 16, processors 18 and production arcs 20 based on at least one of the loading tool capacity 80 and processor capacity 82. Production values 100, 102 and 104 for the loading tools 16, processors 18 and production arcs 20 are then produced based on the target values 90, 92 and 94, at box 122. At box 124, route assignments for the mining machines 14 are determined based on the production values 100, 102 and 104.

The system 10 and method described herein provide a solution for developing a production plan for a mining site 12 based on specific goals of operators of the mining site 12, maximization of shortest path production and optimization using an algorithm, such as a least squares algorithm. In particular, the system 10 and method facilitate the specification of particular production and processing of a given material.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A system for mining site production planning, comprising:
   a mining site including loading tools, processors and production arcs; and a control system configured to:
      specify a problem-solving technique and associated optimization problem for the mining site by:
         setting production goals for each of the loading tools, processors and production arcs;
         sorting the production arcs in an order based on travel distances;
         modifying the order of the sorted production arcs based on the production goals for each of the loading tools, processors and production arcs; and
         setting target values for each of the loading tools, processors and production arcs according to the modified order of the sorted production arcs; and
      solve the optimization problem to produce production values for each of the loading tools, processors and production arcs based on the target values.

2. The system of claim 1, wherein the control system is further configured to determine route assignments for a plurality of mining machines based on the production values for each of the loading tools, processors and production arcs.

3. The system of claim 1, wherein the production arcs are sorted in an ascending order based on the travel distances.

4. The system of claim 1, wherein the control system is further configured to specify the problem-solving technique by:
   associating a loading tool capacity and a processor capacity to each of the modified order of the sorted production arcs; and
   setting the target values for each of the loading tools, processors and production arcs based on at least one of the loading tool capacity and the processor capacity.

5. The system of claim 1, wherein the production goals for each of the loading tools, processors and production arcs are set based on capacity of at least one of the loading tools, processors and production arcs.

6. The system of claim 5, wherein the production goals for each of the loading tools, processors and production arcs are set based on a number of mining machines available for the production arcs.

7. The system of claim 5, wherein the production goals for each of the loading tools, processors and production arcs are set based on a total production capacity.

8. The system of claim 1, wherein the order of the sorted production arcs is modified based on an inverse priority ordering of the production goals.

9. The system of claim 8, wherein production restrictions are set for each of the modified order of the sorted production arcs.

10. A method for mining site production planning, wherein a mining site includes loading tools, processors and production arcs, the method comprising:
   receiving production goals for each of the loading tools, processors and production arcs, at a controller;
   sorting the production arcs in an order based on travel distances, using the controller;
   modifying the order of the sorted production arcs based on the production goals for each of the loading tools, processors and production arcs, using the controller;
   setting target values for each of the loading tools, processors and production arcs according to the modified order of the sorted production arcs, using the controller; and
   producing production values for each of the loading tools, processors and production arcs based on the target values, using the controller.

11. The method of claim 10, further comprising determining route assignments for a plurality of mining machines based on the production values for each of the loading tools, processors and production arcs.

12. The method of claim 10, further comprising:
   associating a loading tool capacity and a processor capacity to each of the modified order of the sorted production arcs; and
   setting the target values for each of the loading tools, processors and production arcs based on at least one of the loading tool capacity and the processor capacity.

13. The method of claim 10, wherein the production goals for each of the loading tools, processors and production arcs are set based on capacity of at least one of the loading tools, processors and production arcs.

14. The method of claim 10, wherein the production goals for each of the loading tools, processors and production arcs are set based on a number of mining machines available for the production arcs.

15. The method of claim 10, wherein the production goals for each of the loading tools, processors and production arcs are set based on a total production capacity.

16. A control system for mining site production planning, wherein a mining site includes loading tools, processors and production arcs, the control system comprising:
   a controller programmed to:
   specify a problem-solving technique and associated optimization problem for the mining site by:
      receiving production goals for each of the loading tools, processors and production arcs;
      sorting the production arcs in an order;
      modifying the order of the sorted production arcs based on the production goals for each of the loading tools, processors and production arcs; and
      setting target values for each of the loading tools, processors and production arcs according to the modified order of the sorted production arcs; and
   solve the optimization problem to produce production values for each of the loading tools, processors and production arcs based on the target values.

17. The control system of claim 16, wherein the controller is further programmed to determine route assignments for a plurality of mining machines based on the production values for each of the loading tools, processors and production arcs.

18. The control system of claim 16, wherein the production arcs are sorted in an ascending order based on travel distances.

19. The control system of claim 16, wherein the controller is further programmed to:
   associate a loading tool capacity and a processor capacity to each of the modified order of the sorted production arcs; and
   set the target values for each of the loading tools, processors and production arcs based on at least one of the loading tool capacity and the processor capacity.

20. The control system of claim 16, wherein the order of the sorted production arcs is modified based on an inverse priority ordering of the production goals.

* * * * *